April 24, 1962 R. J. KOERNER 3,031,650

MEMORY ARRAY SEARCHING SYSTEM

Filed July 23, 1959 4 Sheets-Sheet 1

INVENTOR
RALPH J. KOERNER
BY MORRIS SPECTOR
ATTORNEYS

April 24, 1962 R. J. KOERNER 3,031,650

MEMORY ARRAY SEARCHING SYSTEM

Filed July 23, 1959 4 Sheets-Sheet 2

INVENTOR
RALPH J. KOERNER

BY

MORRIS SPECTOR

ATTORNEYS

April 24, 1962 R. J. KOERNER 3,031,650

MEMORY ARRAY SEARCHING SYSTEM

Filed July 23, 1959 4 Sheets-Sheet 3

INVENTOR
RALPH J. KOERNER
BY MORRIS SPECTOR
ATTORNEYS

INVENTOR
RALPH J. KOERNER
BY MORRIS SPECTOR
ATTORNEYS

United States Patent Office 3,031,650

Patented Apr. 24, 1962

3,031,650
MEMORY ARRAY SEARCHING SYSTEM

Ralph J. Koerner, Redondo Beach, Calif., assignor to Thompson Ramo Wooldridge Inc., Los Angeles, Calif., a corporation of Ohio Filed July 23, 1959, Ser. No. 828,964
8 Claims. (Cl. 340—174)

This invention relates to searching systems for information stored in arrays of storage elements, and in particular to a system for locating in the array records possessing predetermined characteristics. As applicable to arrays of storage elements in digital computers, the invention is related to the "look-up" process, i.e., the accessing of desired information stored in the array.

A memory array for storing binary information commonly comprises a plurality of storage elements, such as magnetic cores, one for each bit, arranged in rows and columns to form a rectangular spatial pattern; means are provided for entering information into the array, and means for accessing information stored in the array. The information contained in a complete row of elements in the array may be a "word," i.e., a complete unit of information, and the information in each column may comprise corresponding bits of the words stored in the array.

The prior art contemplates the "look-up" of stored information by complete words, utilizing a process which involves identifying each row by a number, but teaches no provision for searching the entire memory to determine if a specific word is stored therein, except by the laborious method of sequentially comparing the word stored in each row to the word sought. This, of course, involves selecting and reading out each different row of the memory array, in sequence, until every word of the array has been examined.

Also, the prior art searching systems make no provision for selecting the rows of an array containing particular information within a word (i.e., "partial" words). For example, suppose every row of a memory array contains a word having the following information about a different man: name, height, weight, color of hair, color of eyes, and occupation. If it is desired to quickly determine the names of all men having a given occupation, the prior art technique requires that all rows be read out, in sequence, and their bits representing the occupations be compared with a binary code number corresponding to the given occupation.

In such searching systems, the accessing of desired information requires an exhaustive sequential search of the entire memory, with each row of the memory being individually compared with the desired information. This is time-consuming and wasteful of equipment, especially in computer operation, where, as well known, the look-up process requisitions considerable operating time, this time can be more profitably devoted to the performance of arithmetic computations on data.

The present invention overcomes this disadvantage by providing a searching system in which simultaneous comparisons are made in every row of a memory to locate the rows having the desired information therein; the need for a sequential search of the memory is entirely eliminated. Broadly, this is accomplished by a generator of interrogation signals corresponding to binary digits of information whose location is sought. The interrogation signals are applied in parallel to the storage elements in the corresponding columns of the memory array, and comparisons are made at each storage element to generate signals to indicate whether or not the state of that element corresponds to its associated interrogation signal. The signals indicating the results of the comparisons along each row of the array are then combined in an output circuit for the row to indicate whether or not the information contained in that row of the memory corresponds to the information represented by the interrogation signals.

To detect the location of partial words in the memory array, the interrogation signal generator is set to emit signals for interrogating only the corresponding columns. The output signals from each row then indicate whether or not the information sought is stored in that row. Thus the presence and location of any desired information is determined by a single interrogation operation for the entire memory array.

It follows that this invention may also be used to check the coding of information stored in the memory, simply by setting the interrogation signals to represent information which is supposed to be stored in a specific row of the array, then interrogating the array as above, and noting from the output signal of the selected row whether or not the desired information is actually stored therein.

In one embodiment of the invention, which includes an array of flip-flop storage elements, a comparison circuit is provided for each flip-flop in the array. The comparison circuit receives as inputs the signal from its associated flip-flop and the signal from the interrogation signal generator, the latter of which is applied in parallel to all comparison circuits in the same column. The comparison circuits each produce as output a comparison signal indicating the identity or non-identity of the signal from the associated flip-flop with respect to the corresponding interrogation signal.

The comparison signals generated along each row are combined in a logical "and" circuit to produce an interrogation output signal when each comparison circuit in the row indicates identity with the associated interrogation signal. In this embodiment the interrogation signals are generated by a plurality of interrogation flip-flops, one corresponding to each column of the array of storage flip-flops.

In another embodiment of the invention, which includes an array of saturable magnetic core storage elements, a "complementary" core is provided for each storage core in the array. The "complementary" cores are coupled to their associated storage cores in such manner as to always assume a state complementary to the state of the storage core; i.e., when the storage core is in the state representing a binary digit 1, its storage core will be in the state representing a binary digit 0, and vice versa.

In this embodiment, interrogation is accomplished by passing a pulse of current through the storage core or its complement, and the cores respond with a voltage pulse output if their state differs from the state sought. The voltage output of all storage and complementary cores along each row are summed, and an absence of voltage on an output conductor indicates that each core of the corresponding row is identical with the code represented by the combination of interrogation pulses. Nondestructive interrogation techniques are preferably employed so that the array can be repeatedly interrogated without disturbing the information stored.

The invention can be directly generalized for arrays having any given number of rows and columns, by simply providing an interrogation signal for each column and an output circuit for each row thereof.

Accordingly, one object of this invention is to provide a means of simultaneously interrogating each row in an array of storage elements to determine the presence or absence of specific information therein, and/or the location of specific information therein.

An additional object of this invention is to provide novel means for quickly checking the coding of information stored in an array of storage elements.

Another object of this invention is to provide novel means for selecting rows of an array of storage elements in accordance with information codes contained therein.

Another object of this invention is to provide a novel array of storage elements adapted for simultaneous interrogation of each row thereof.

Other objects and advantages of the invention will be apparent to those skilled in the art from the following description of several illustrative embodiments thereof, in connection with the attached drawings in which.

Figure 1:
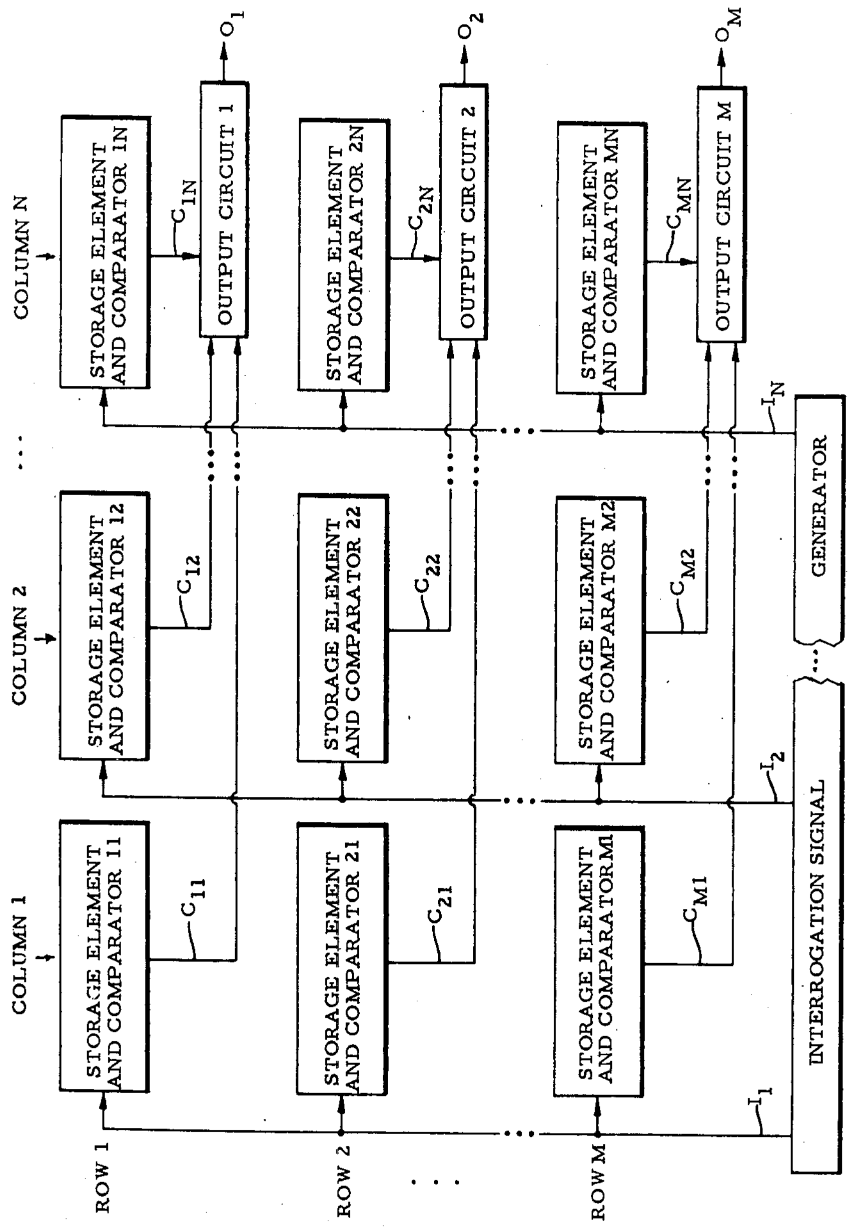
FIG. 1 is a general block diagram of the invention.

Reference is now made to FIG. 1, which shows a generalized block diagram of the invention, wherein a plurality of storage elements and comparators 11 through MN are arrayed in a rectangular pattern of M rows and N columns. The array may be a part of a computer memory, or any other device utilizing an array of storage elements. It will be understood, of course, that if the array comprises part of a memory, means will be provided for entering information into the array (i.e., "writing") and for receiving information from the array (i.e., "reading"). Such means are well known to those skilled in the art, and will not be described here.

A plurality of interrogation signals $I_1$ through $I_N$ are generated by an interrogation signal generator and applied in parallel to all elements in a corresponding column of the array. Interrogation signals $I_1$ through $I_N$ correspond to respective bits of an interrogation code (word or partial word) whose presence or absence in the array is to be determined. By this means each row of the array can be simultaneously interrogated by a signal representing the corresponding bit of the interrogation code. Interrogation signals $I_1$ through $I_N$ may be generated simultaneously, or in time sequence if desired.

Associated with each storage element is a comparator which is operable to compare the state of the storage element to the corresponding interrogation input signal, and to produce a comparison signal indicating the identity or non-identity therebetween. Thus for each row, N comparison signals are generated; these are applied to an output circuit for the row. Thus for row 1 signals $C_{11}$ . . . $C_{1N}$ are applied to output circuit 1, which produces an output signal $O_1$ representing the identity or non-identity of the information stored in row 1 with respect to the code represented by the interrogation signals.

If the interrogation code contains as many bits as the number of columns in the array, interrogation signals $I_1$ . . . $I_N$ will each be set to represent the corresponding bit of the interrogation code, and output signals $O_1$ . . . $O_M$ will indicate the identity or non-identity of their entire row with respect to the interrogation code. However, the interrogation code need not contain as many bits as there are columns in the array. It may be desired to identify all rows having common codes of shorter length, as for example, all rows having a digit 1 for the first bit and a digit 0 for the second bit. In this case the array may be interrogated only by interrogation signals $I_1$ and $I_2$, and the output signals $O_1$ through $O_N$ would then identify each row having a digit 1 for the first bit and a digit 0 for the second bit.

Figure 2:
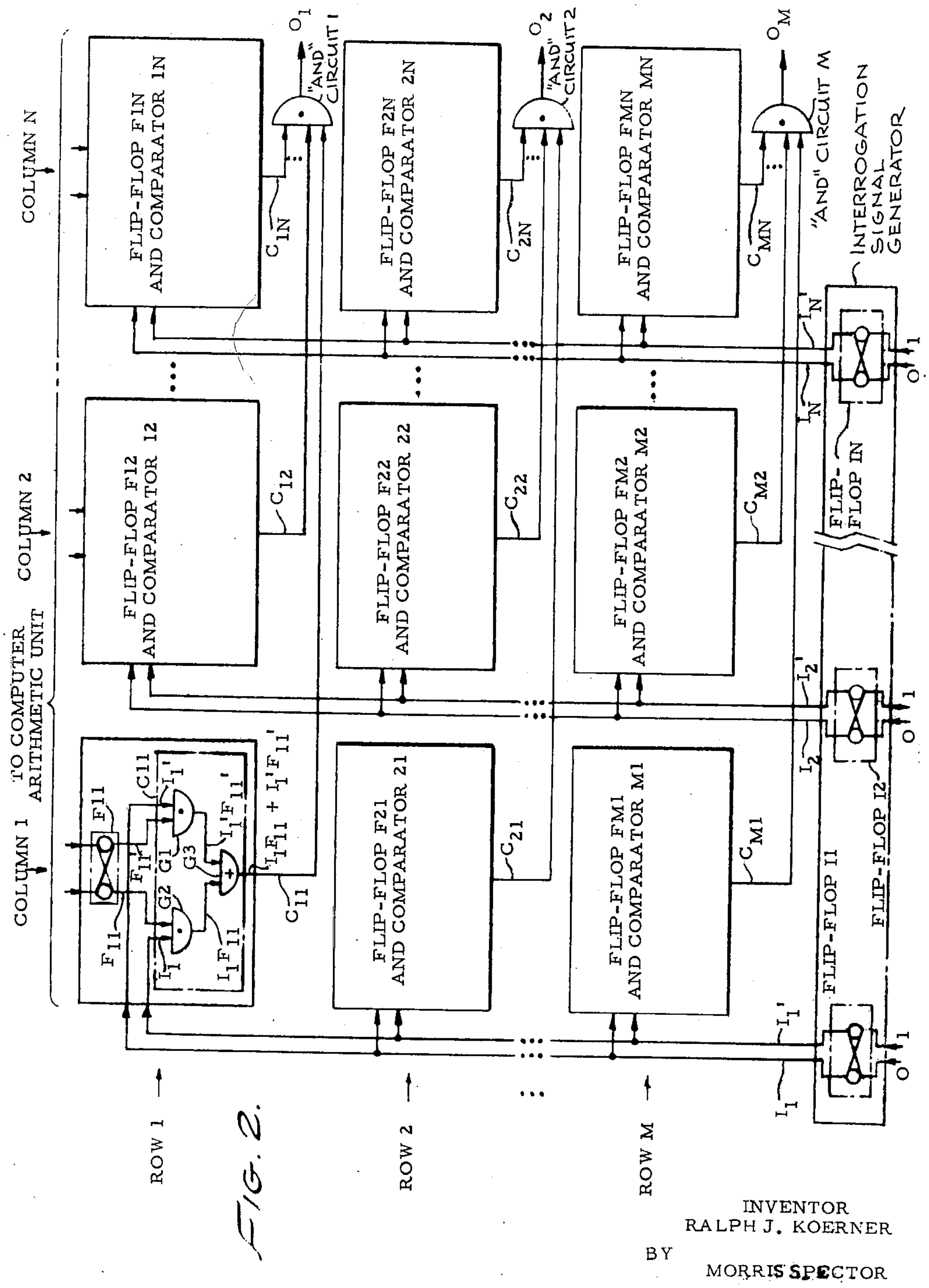
FIG. 2 is a block diagram of an embodiment of the invention adapted for use with an array having flip-flops as storage elements.

FIG. 2 shows an embodiment of the invention for use with an array having flip-flops F11 through FMN as the storage elements thereof, priorly set by, for instance, the arithmetic unit of a computer as indicated. In this embodiment each storage element has associated therewith a comparator circuit such as comparator circuit C11 comprising "and" gates G1 and G2 and an "or" gate G3. Complementary interrogation input signals $I_1$ and $I_1'$ are applied to gates G2 and G1, respectively, for comparison with signals $F_{11}$ and $F_{11}'$ which are the outputs of flip-flop F11. It will be understood, of course, that when signal $F_{11}$ is high and signal $F_{11}'$ is low, flip-flop F11 is "on," and when signal $F_{11}$ is low and signal $F_{11}'$ is high, flip-flop F11 is "off." To interrogate the flip-flop, the signal $I_1$ is set high if an "on" state is sought, and the signal $I_1'$ is set high if an "off" state is sought. As a specific example, suppose flip-flop F11, which represents the first bit of the row 1, is in the "on" state and the first bit of the interrogation code is in an "on" state. In this case signals $F_{11}$ and $I_1$ will be high and signals $F_{11}'$ and $I_1'$ will be low. Therefore high output signal $I_1.F_{11}$ will be produced by "and" gate G2, and consequently high output signal $C_{11}$ will be produced through "or" gate G3. If flip-flop F11 is in the "on" state and the first bit of the interrogation code is an "off" state, signals $F_{11}$ and $I_1'$ will be high and signals $F_{11}'$ and $I_1$ will be low, whereupon the output signals from both gates G1 or G2 will be low, and consequently the output signal $C_{11}$ from gate G3 will be low. Thus, in this specific embodiment, the ouput signals $C_{11}$ through $C_{MN}$ are high whenever the state of their associated flip-flop is identical with the state of the corresponding bit of the interrogation code.

The comparison signals for each row are applied to an associated "and" circuit, which produces high output signal $O_1$ . . . $O_M$ whenever the comparison signal in the row is high. Thus the output signal $O_1$ will be high whenever each bit of information stored in row 1 is identical with each bit of the interrogation code, and conversely the ouput signal $O_1$ will be low if any bit of row 1 differs from the interrogation code.

The interrogation signals $I_1$, $I_1'$; . . . $I_N$, $I_N'$ are produced by a plurality of flip-flops I1 through IN corresponding to the number of bits in the interrogation code, which may equal the number of columns in the array.

The interrogation code is set into the interrogation signal generator by input signals designated as "0" and "1" which control the state of the interrogation flip-flops I1 through IN in accordance with the respective bit of the desired interrogation code.

Figure 3A:
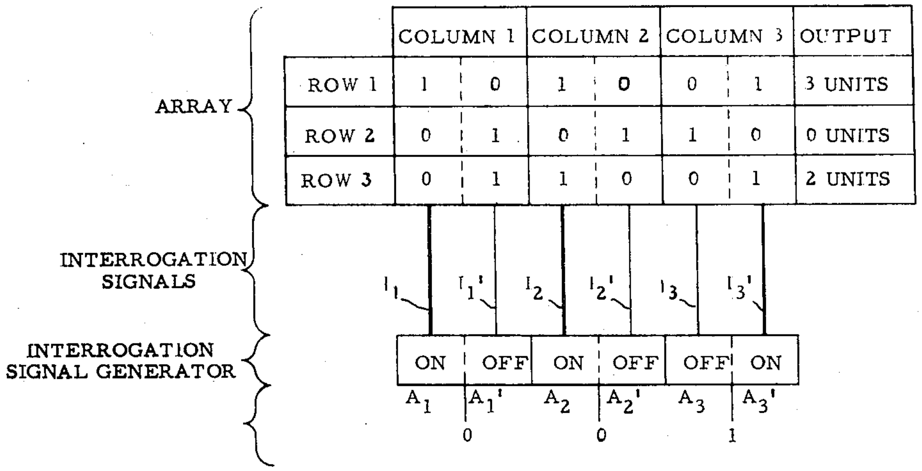
FIG. 3A is a chart illustrating the operation of the embodiment disclosed in FIG. 3 when interrogated by the binary code 001.
Figure 3B:
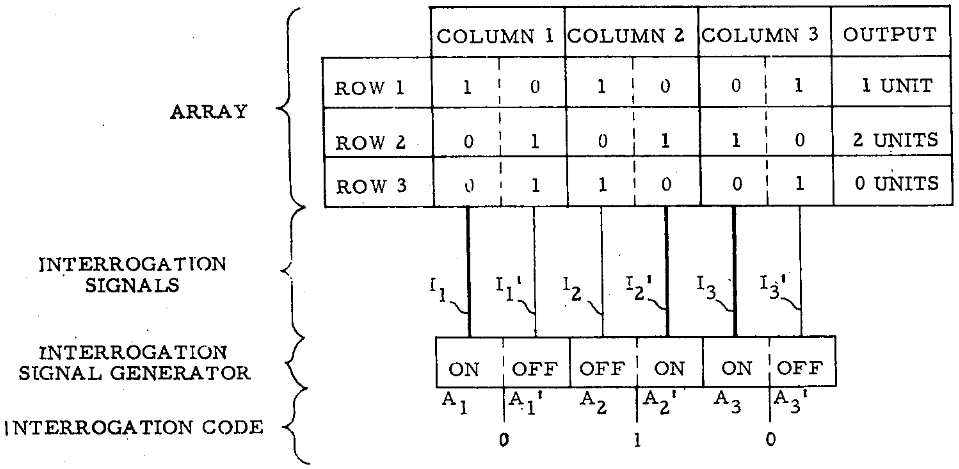
FIG. 3B is a chart illustrating the operation of the embodiment disclosed in FIG. 3 when interrogated by the binary code 010.
Figure 3:
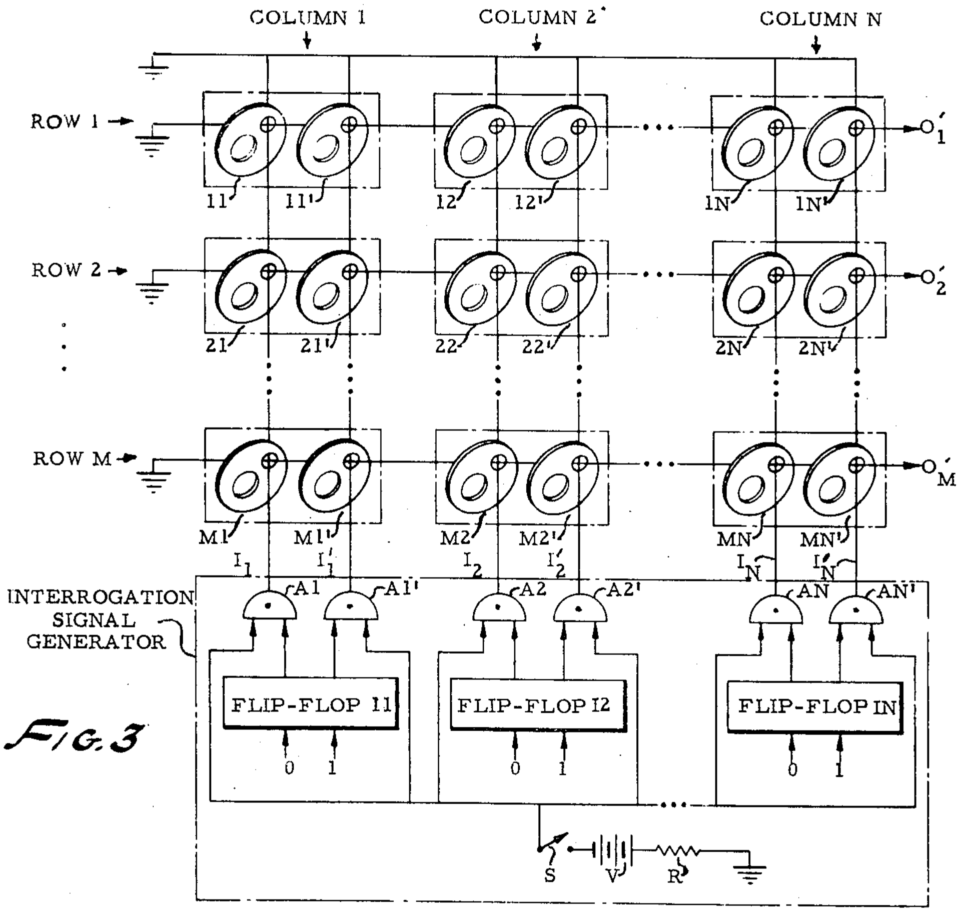
FIG. 3 is a schematic diagram of a second embodiment of the invention adapted for use with an array having magnetic cores as storage elements.

FIG. 3 shows an embodiment of the invention which utilizes saturable core magnetic storage elements, preferably of the type which can be read non-destructively, such as the multiaperture ferrite magnetic cores known as transfluxors. Transfluxors comprise a core with two circular apertures of unequal diameter, the apertures being placed to form a three-legged core in which the first leg is formed by the material between the large aperture and the adjacent core edge, the second leg by the material between the small aperture and the adjacent core edge and the third leg by the material between the apertures. A control winding is placed on the first leg of the core, with signal input and signal output windings on the third leg of the core.

When a current pulse is sent through the control winding of the transfluxor, the second and third legs of the core become saturated in the same direction and the core is said to be "blocked." In the blocked state, A.-C. signals applied to the input winding will not be transferred to the output winding, since the magnetic circuit coupling the input and output windings is saturated with respect to either polarity of input signal. Once blocked, the core remains blocked until unblocked by an unblocking pulse, which is applied to the control winding. The unblocking pulse is smaller in amplitude than the blocking pulse and of opposite polarity.

The effect of the unblocking pulse is to reverse at least part of the flux in the second leg without reversing the flux in the third leg; as a result, the second and third legs become saturated in opposite directions. In this condition, an A.-C. signal applied to the input winding will be transferred to the output winding. The unblocked state will persist until another blocking pulse is applied to the control winding, which returns the second leg to saturation in the same direction as the third.

The blocked or unblocked state of the core may be considered as representing binary digits, and the state may be determined non-destructively by applying an input signal to the input winding and noting whether or not an output signal appears at the output winding.

Referring again to FIG. 3, a plurality of transfluxor cores are shown arrayed by pairs in a rectangular pattern of M rows and N columns. Each pair of cores is connected, by means not shown, to be complementary, i.e., to always be in opposing states. It will be understood by those skilled in the art that this can be accomplished quite simply by providing control circuits which apply an unblocking pulse to one core when a blocking pulse is applied to the other, and vice versa.

One member of each core pair serves as a storage element whose state represents binary information. In FIG. 3, the left-hand member of each core pair, which is marked by unprimed numbers, e.g., core 11, is the storage core. The right-hand member of each core pair is designated by a corresponding primed number, e.g., core 11', and will hereinafter be referred to as a "complementary" core. In a sense, there are two rectangular arrays shown in FIG. 3—the array of storage cores, which function as an information store, and the array of complementary cores, which function to simplify the means of searching the store, as will be explained in detail below.

It will be understood, of course, that the storage cores will, in practice, be provided with reading and writing means and that the writing circuit means will include means for maintaining each core pair in complementary states. These will not be described herein since they are well known and since their specific form is immaterial to the present information retrieval process.

A plurality of input signals $I_1$ . . . $I_N$ and $I_1'$ . . . $I_N'$ are applied in series to respective columns of cores. The conductors carrying these signals comprise the input winding noted in the discussion of transfluxors above. A plurality of output signals $O_1$ . . . $O_M$ are obtained from respective rows of cores. The output conductors carrying these signals comprise the output windings mentioned in the discussion of transfluxors above. Therefore, if an input signal is applied, an output signal will appear on the output conductor of each unblocked core, while no output signal will appear on the output conductor of each blocked core. For example, suppose a pulse of current, signal $I_1$, occurs and every storage core in column 1 is blocked except core number 11. In this case, an output signal pulse $O_1$ only will appear.

This embodiment of the invention contemplates detecting the location of a desired code in the storage array by pulsing current through the input conductors and detecting the voltage level on the output conductors. To detect a blocked state of a storage core, a pulse of current is passed through the storage core and the blocked state is detected by an absence of output voltage. To detect an unblocked state of a storage core, a pulse of current is passed through the associated complementary core (which is blocked), such that the unblocked state is also detected by an absence of output voltage. It will be understood, of course, that the blocked and unblocked states can be detected by the presence of output voltage if desired, by passing current through the member of the core pair which will be unblocked if the desired state prevails.

The input current pulses are provided by an interrogation signal generator comprising voltage source V, resistance R, interrogation switch S, and gates A1 . . . AN and A1' . . . AN'. The gates are controlled by a plurality of flip-flops I1 . . . IN, which route current through the storage cores or their complementary cores depending on whether a blocked or unblocked state is sought. The operation of this embodiment can be better understood with reference to the charts shown in FIGS. 3A and 3B. In these charts, it is assumed that the blocked state of the storage core represents a binary 0 and that the unblocked state represents a binary 1.

The charts in FIGS. 3A and 3B show the state of the elements in a 3 by 3 array, and the process of detecting the presence of the binary codes 001 and 010, respectively. In both charts, the state of the storage elements is assumed to be the same. In FIG. 3A, the array is interrogated to detect the presence of 001 by pulsing input signals $I_1$, $I_2$ and $I_3'$, with no current through the remaining input conductors. The output voltages from each core are linearly added in the output conductors to give the output levels shown in the chart. No output appears on the row which contains the desired code. Thus, the identity of a row with respect to the interrogation code is detected by the absence of voltage on the respective output line, and the non-identity of a row with respect to the interrogation code is indicated by the presence of output voltage on the respective output line, with the magnitude of the voltage indicating the number of bits by which the row differs from the interrogation code.

FIG. 3B shows an example similar to that discussed above, where the array of storage cores is interrogated by a different binary code 010. In this case, the interrogation current is passed through as signals $I_1$, $I_2'$ and $I_3$, and a zero output occurs on row 3, which is identical with the interrogation code.

From the examples of FIGS. 3A and 3B, it will be apparent that the location of any desired code is detected in this embodiment by (1) setting the flip-flops in the signal generator in accordance with the desired code, (2) closing interrogation switch S (FIG. 3) to pulse current through the cores which will be blocked if the information in the array corresponds to the interrogation code, and (3) detecting a null condition on the output lines which indicates that each core in the corresponding row is indeed in the state representing the interrogation code.

It is not necessary that the interrogation code contain as many digits as the information in the array. It may, for example, be desired to detect the location of all rows having a blocked storage core in one specific column. In this case, current would be pulsed only through that specific column, and the absence of voltage on the output lines would indicate that the core in that specific column was indeed blocked.

It will be readily apparent that this embodiment of the invention can also be used for checking the coding of information entered in any row, by the simple process of setting the interrogation signal generator to represent the code which is supposed to be stored in a certain row, interrogating the array, and observing the output signal of the chosen row. If the information stored in the row is correct, a zero indication should result; and if incorrect, the magnitude of the output voltage will represent the number of bits by which the row differs from the desired code.

Figure 4:
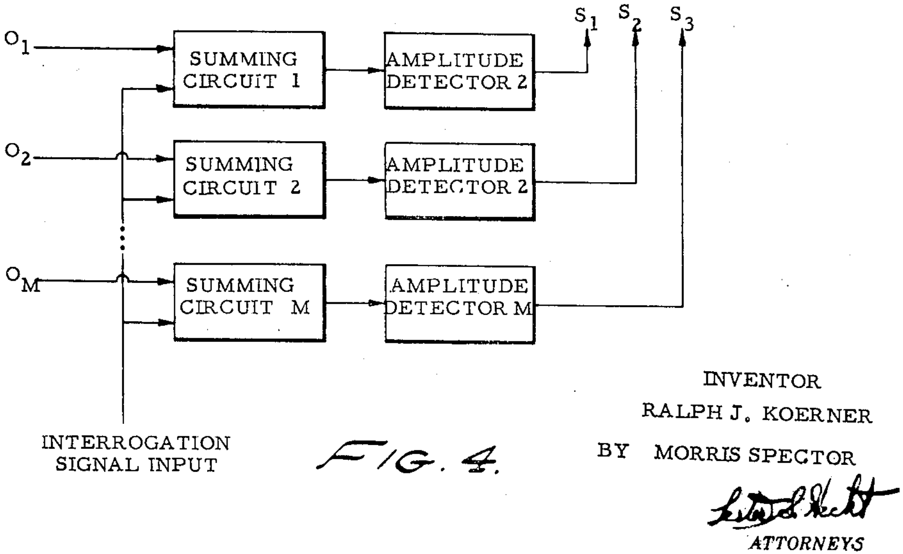
FIG. 4 shows a suitable output circuit arrangement for the embodiment of FIG. 3.

FIG. 4 shows an arrangement whereby the null indications of the embodiment disclosed in FIG. 3 may be translated into output signals. Each output conductor is added in a summing circuit to the interrogation signal input, and the sum thereof is applied to an associated amplitude detector, which produces an output signal within a narrow range of voltage above and below the interrogation signal input level. In this manner, a null indication on output line $O_1$ during interrogation can be translated into a signal $S_1$.

This invention, of course, is not limited to non-destructive magnetic cores or to transfluxors as described above, but transfluxors have been used as examples only in describing the embodiment shown in FIG. 3.

From the foregoing description it will now be apparent that this invention provides interrogation means which may be used in combination with an array of storage elements to simultaneously interrogate all rows of said array with any desired code to produce output signals representing the identity or non-identity of the rows with respect to the interrogation code. It will also be apparent that this invention provides a means for checking the coding of information contained in an array of storage elements, or for selecting portions of an array of storage elements in accordance with any desired code. It should be understood that this invention is not limited to the specific structures disclosed herein, since many modifications may be made without departing from the basic teaching of this invention. For example, in the embodiment disclosed in FIG. 2, a single comparator circuit may be utilized in place of the three gates disclosed, and a single input conductor may be used for the interrogation of each column rather than the complementary input conductors shown. This can be accomplished by a system wherein the level of a single signal is used to represent either the 0 or 1 condition, both from the interrogation signal generator and from the storage flip-flops. The combined comparison circuit would in this case simply compare the level of the flip-flop signal to the corresponding interrogation signal, and produce an output comparison signal when the two levels are the same; thus indicating identity between the state of the storage flip-flop and the interrogation signal generator flip-flop. Also, in the embodiment disclosed in FIG. 2, the comparators may be adapted such that the output signals $C_{11}$ through $C_{MN}$ indicate non-identity rather than identity, and an "or" circuit might be used in the place of the "and" circuits disclosed to produce the output signals $O_1$ through $M_M$. In this case, a lack of signal output would indicate identity in the row. In the embodiment disclosed in FIG. 3, the interrogation signal generator may be formed by many other circuits in place of the combination of flip-flops and "and" gates as disclosed therein. One obvious variation would be to employ a single pole double-throw switch for manually selecting between the two pairs of input conductors in accordance with the desired input code. In this case, the switch positions would be marked as illustrated by the examples in FIGS. 3A and 3B. These and many other modifications will be apparent to those skilled in the art, and this invention includes all modifications falling within the scope of the following claims.

I claim:

1. A switching device for producing an output signal on one of a plurality of output leads according to the binary representation of an input code, said device comprising: a plurality of storage elements arranged in rows and columns, said rows corresponding in number to the number of said output leads and said columns corresponding in number to the number of binary digits in said input code; interrogation signal generator means for producing interrogation signals corresponding respectively to the binary digits of said input code; means for applying each interrogation signal produced by said signal generator to all of the storage elements in a corresponding column of said storage elements; means in circuit connection with each storage element for interpreting the signal received from said signal generator means and the state of the corresponding storage element to produce an output signal indicating the comparison therebetween; and output means for combining rows of said storage elements to produce said output signals, each output signal representing the result of all comparisons performed along a corresponding row.

2. A switching arrangement for producing an output signal at a selected one of a plurality of output leads in accordance with the binary states of the digits of an input code, said arrangement comprising: storage elements S11, S12 . . . S1N arranged in a first row, storage elements S21, S22 . . . S2N arranged in a second row . . ., and storage elements SM1, SM2 . . . SMN arranged in an Mth row; comparators C11, C12 . . . C1N, C21, C22 . . . C2N, and CM1, CM2 . . . CMN coupled to said storage elements, respectively; output circuits O1, O2 . . . OM coupled to all comparators in a corresponding row, respectively; a signal generator for receiving said input code and for producing corresponding control signals for each binary digit thereof; and means coupling said signal generator and said output circuits to said storage elements and comparators to derive therefrom said output signals to represent all of the comparisons performed along a corresponding row, the condition of all comparisons along a row determining the state of the output signal produced by the corresponding output circuit.

3. A searching device for simultaneously interrogating an array of storage elements to detect the presence and position of a predetermined pattern therein, the array of storage elements being arranged in rows and columns, each row representing a unit of information, and each column representing the same bit for every row, said searching device comprising: interrogation signal generator means adapted to produce a plurality of interrogation signals in accordance with said predetermined pattern, each interrogation signal corresponding to a respective bit of said predetermined pattern, and means for applying each interrogation signal to all storage elements in a corresponding column of the array; a plurality of comparators coupled to corresponding storage elements, each comparator adapted to produce a comparison signal indicating the identity or non-identity of the corresponding storage element with respect to the interrogation signal applied thereto; a plurality of output circuits coupled to each comparator in a corresponding row of the array, and each output circuit adapted to produce an output signal indicating the presence or absence of said predetermined pattern in the corresponding row when the array is interrogated by said interrogation signals.

4. An electrical circuit comprising an array of magnetic storage elements arranged in rows and columns, each magnetic storage element comprising a storage core and a complementary core, the complementary cores being adapted to assume a state complementary to the state of the associated storage core, and each core being operable to produce a voltage output signal in one state thereof when interrogated by a current pulse, and each core being operable to produce no voltage output signal in a complementary state thereof when interrogated by a current pulse; interrogation signal generator means adapted to produce a plurality of current pulses in accordance with a predetermined interrogation pattern, each of said current pulses being applied to each magnetic storage element in a corresponding column of the array, and said current pulses being applied to either the storage cores or the complementary cores of the column in accordance with said predetermined interrogation pattern; and output means linking each core of a respective row in such manner as to detect voltage output signals produced by said cores in response to said current pulses, and the level of voltage detected by said output means indicating the identity or non-identity of the corresponding row with respect to said predetermined interrogation pattern.

5. The circuit defined in claim 4 wherein each storage core represents a binary digit, and each row of storage cores represents a binary word, and each column of storage cores represents the same bit of every binary word; and wherein each column of storage cores and each column of complementary cores is linked by a common current input coupling such that two separate current input couplings are provided for each bit of words stored in the array; and wherein every core of each row is linked by a common voltage output coupling which adds together any voltage output signals produced by cores in the corresponding row in response to current pulses; and wherein said interrogation signal generator means is adapted to generate a current pulse corresponding to each bit of a predetermined interrogation pattern, said current pulse being routed to the associated storage cores for one state of the bit and to the associated complementary cores for the opposing state of the bit.

6. The circuit defined in claim 5 wherein said interrogation signal generator means comprises: a plurality of bistable devices, each bistable device corresponding to a respective bit of an interrogation word; a storage gate and a complementary gate coupled to each bistable device, the gates connected such that when one gate is open, the other is closed, the storage gate adapted to open for one state of the bistable device, and the complementary gate adapted to open for the other state of the bistable device, each storage gate coupled to a corresponding current input coupling for a column of storage cores, and each complementary gate coupled to a corresponding current input coupling for a column of complementary cores; means for setting the state of said bistable devices to represent a predetermined interrogation pattern; and means for applying a pulse of current to each gate to detect the presence of said predetermined interrogation pattern represented by the state of said bistable devices.

7. The circuit of claim 4 wherein each of said cores is capable of being read nondestructively.

8. The circuit of claim 4 wherein each of said cores comprises a multiapertured core.

References Cited in the file of this patent

UNITED STATES PATENTS

| | | |
|---|---|---|
| 2,881,415 | Damousseau | Apr. 7, 1959 |
| 2,900,132 | Burns | Aug. 18, 1959 |

FOREIGN PATENTS

| | | |
|---|---|---|
| 1,153,114 | France | Mar. 3, 1958 |
| 1,155,548 | France | May 5, 1958 |
| 1,179,895 | France | May 28, 1959 |

OTHER REFERENCES

"Experiments on a Three-Core Cell," Raffel and Branspices, IRE Convention Record, 1955 National Convention, Part 4, Computers and Information Theory, pp. 64–69.

UNITED STATES PATENT OFFICE
CERTIFICATE OF CORRECTION

Patent No. 3,031,650 April 24, 1962

Ralph J. Koerner

It is hereby certified that error appears in the above numbered patent requiring correction and that the said Letters Patent should read as corrected below.

Column 7, line 37, for "$M_M$" read -- $O_M$ --.

Signed and sealed this 20th day of November 1962.

(SEAL)
Attest:

ERNEST W. SWIDER
Attesting Officer

DAVID L. LADD
Commissioner of Patents

Notice of Adverse Decision in Interference

In Interference No. 95,743 involving Patent No. 3,031,650, R. J. Koerner, MEMORY ARRAY SEARCHING SYSTEM, final judgment adverse to the patentee was rendered Sept. 6, 1967, as to claim 2.

[*Official Gazette November 7, 1967.*]